: US005940281A

United States Patent [19]
Wolf

[11] Patent Number: 5,940,281
[45] Date of Patent: Aug. 17, 1999

[54] SWITCHED-MODE POWER SUPPLY WITH MAGNETIC FLUX DENSITY CONTROL

[75] Inventor: Peter Wolf, Leinfelden-Echterdingen, Germany

[73] Assignee: Robert Bosch GmbH, Stuttgart, Germany

[21] Appl. No.: 08/981,982

[22] PCT Filed: Jun. 21, 1996

[86] PCT No.: PCT/DE96/01091

§ 371 Date: Jan. 8, 1998

§ 102(e) Date: Jan. 8, 1998

[87] PCT Pub. No.: WO97/03492

PCT Pub. Date: Jan. 30, 1997

[30] Foreign Application Priority Data

Jul. 8, 1995 [DE] Germany ............................ 195 24 963

[51] Int. Cl.⁶ .......................... H02M 3/335; H02M 3/24; H02H 7/122
[52] U.S. Cl. .................... 363/21; 363/56; 363/97
[58] Field of Search ................. 363/20, 21, 50, 363/56, 78, 97

[56] References Cited

U.S. PATENT DOCUMENTS

| | | | |
|---|---|---|---|
| 3,714,545 | 1/1973 | Chiffert | 363/21 |
| 4,538,719 | 9/1985 | Gray et al. | 194/100 |
| 4,601,380 | 7/1986 | Dean et al. | 194/318 |
| 4,686,365 | 8/1987 | Meek et al. | 250/281 |
| 4,688,158 | 8/1987 | Peterson et al. | 363/21 |
| 4,739,462 | 4/1988 | Farnsworth et al. | 363/56 |
| 4,749,074 | 6/1988 | Ueui et al. | 194/317 |
| 4,754,862 | 7/1988 | Rawicz-Szczerbo et al. | 194/319 |
| 4,845,994 | 7/1989 | Quinlan, Jr. | 73/163 |
| 4,951,800 | 8/1990 | Yoshihara et al. | 194/317 |
| 4,995,497 | 2/1991 | Kai et al. | 194/318 |
| 5,007,520 | 4/1991 | Harris et al. | 194/317 |
| 5,033,603 | 7/1991 | Kai et al. | 194/334 |
| 5,062,518 | 11/1991 | Chitty et al. | 194/317 |
| 5,085,309 | 2/1992 | Adamson et al. | 194/317 |
| 5,155,960 | 10/1992 | Shaanan | 52/884 |
| 5,158,166 | 10/1992 | Barson | 194/319 |
| 5,180,046 | 1/1993 | Hutton et al. | 194/319 |
| 5,226,520 | 7/1993 | Parker | 194/317 |
| 5,305,192 | 4/1994 | Bonte et al. | 363/56 |
| 5,379,876 | 1/1995 | Hutton | 194/319 |
| 5,469,952 | 11/1995 | Kershaw et al. | 194/317 |
| 5,489,015 | 2/1996 | Wood | 194/318 |
| 5,515,960 | 5/1996 | Wood | 194/328 |
| 5,577,591 | 11/1996 | Abe | 194/343 |
| 5,657,847 | 8/1997 | Tod et al. | 194/207 |

FOREIGN PATENT DOCUMENTS

| | | | |
|---|---|---|---|
| 0 155 126 A2 | 9/1985 | European Pat. Off. | G07F 3/02 |
| 0 164 110 A3 | 12/1985 | European Pat. Off. | G07F 3/02 |
| 0 384 375 B1 | 8/1990 | European Pat. Off. | G07F 3/02 |
| 0 404 432 A2 | 12/1990 | European Pat. Off. | G07F 3/02 |
| 2 094 008 | 9/1982 | United Kingdom | G01R 19/04 |
| 2 169 429 | 7/1986 | United Kingdom | G07D 5/08 |
| 2 200 778 A | 8/1988 | United Kingdom | G07D 5/00 |
| 2 238 152 | 5/1991 | United Kingdom | G07F 3/02 |
| WO 85 04037 | 9/1985 | WIPO | G07F 3/02 |

*Primary Examiner*—Peter S. Wong
*Assistant Examiner*—Bao Q. Vu
*Attorney, Agent, or Firm*—Kenyon & Kenyon

[57] ABSTRACT

A switched-mode power supply with a transformer where the output current or the output voltage is controlled or regulated as a function of the, magnetic flux density of the transformer. Thus it is advantageously avoided that the transformer runs into saturation, especially at large pulse widths. Due to the fact that the magnetic flux density is limited to a preset level, the power components can be optimized because of the limited thermal stress.

3 Claims, 4 Drawing Sheets

SWITCHED-MODE POWER SUPPLY WITH MAGNETIC FLUX DENSITY CONTROL

BACKGROUND INFORMATION

In the related art, the output current or the output voltage in a switched-mode power supply is regulated in the current mode or in the voltage mode.

In the current mode, the switched-mode regulator operates according to the following principle: a peak current setpoint that is to be reached in the transformer is selected. Then a certain pulse width is established in the transformer, depending on the setpoint, as illustrated in FIG. 1. This shows the current I in the transformer, the setpoint of the peak current $I_s$ and the resulting pulse width p.

It can easily be seen that the pulse width p can very rapidly assume large values in transient processes, so the transformer runs into saturation after only a few cycles because it is no longer completely demagnetized at large pulse widths. One could of course limit the pulse width p to a fixed value, but this has the disadvantage that long-range power supply units can hardly be implemented.

In the voltage mode, the selected setpoint is not a peak current but instead it is the pulse width p directly (FIG. 2). This is generated by comparison of a delta voltage or a saw-tooth voltage with the setpoint. However, here again there is the same problem that the pulse width p can vary too much in transient processes, and then the transformer no longer demagnetizes. FIG. 2 shows the three signals in the voltage mode: delta voltage $U_D$, setpoint $U_s$ and pulse width p.

The object of the present invention is to find a possibility of limiting the pulse width according to the single-ended flux converter principle in a switched-mode power supply so that saturation phenomena in the transformer and the associated overvoltages are prevented.

SUMMARY OF THE INVENTION

By stipulating or limiting the maximum flux density in the transformer, instead of the peak current or the pulse width directly (current or voltage mode), it is possible to optimally utilize the transformer as well as the power components and expose them to the least thermal stress (due to the resulting overvoltages).

In addition, there are advantages in start-up of the switched-mode power supply because the pulse width never exceeds inadmissible values, and a "smooth start" is automatically achieved due to a favorable arrangement of the required components.

An advantageous secondary effect is achieved for the output controller. Although the system tends to instability in the current mode in particular (at least in the extreme ranges: rated load with line undervoltage, no-load operation and short-circuit of the output), the switching controller principle according to the present invention yields increased stability properties.

And finally, the switching controller can be designed very simply with existing integrated circuits (IC) for the current mode. The primary shunt resistor is eliminated, which permits a greater efficiency of the power supply unit.

DETAILED DESCRIPTION

Figure 1:
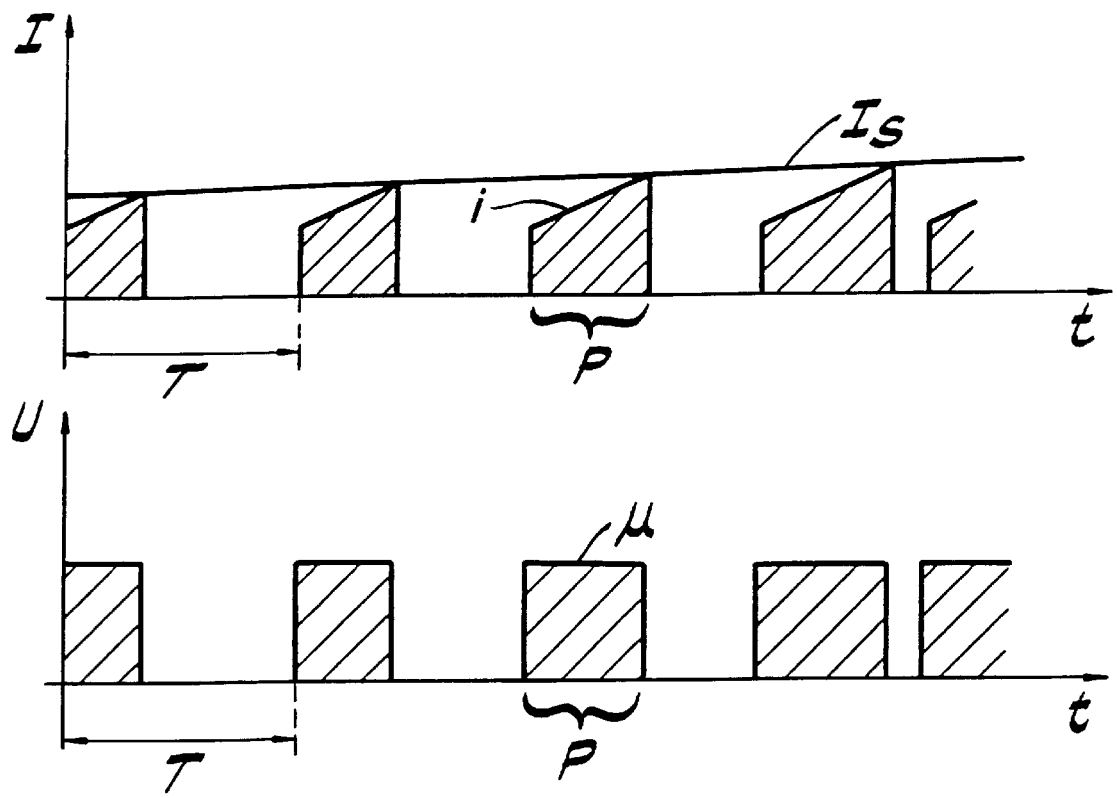
FIG. 1 shows current and voltage diagrams of a known controller in the current mode.
Figure 2:
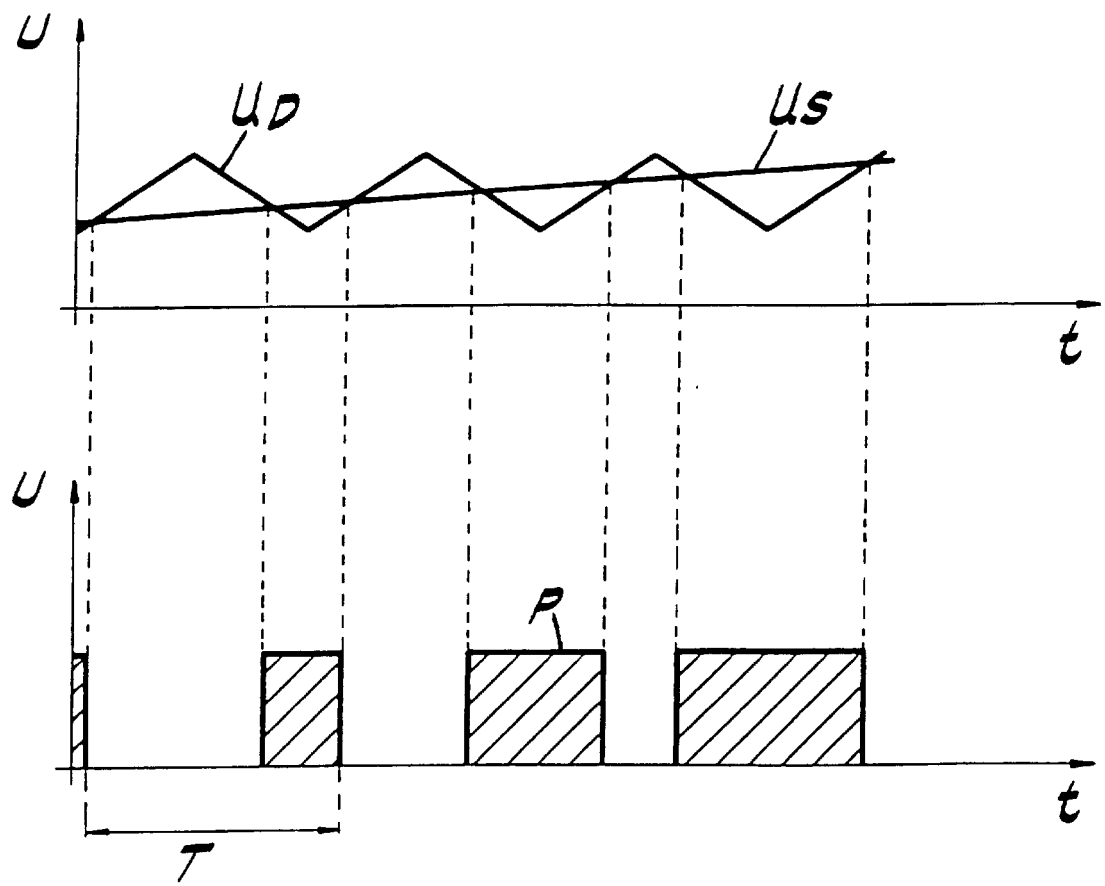
FIG. 2 shows two voltage diagrams of a known switching controller in the voltage mode.
Figure 3:
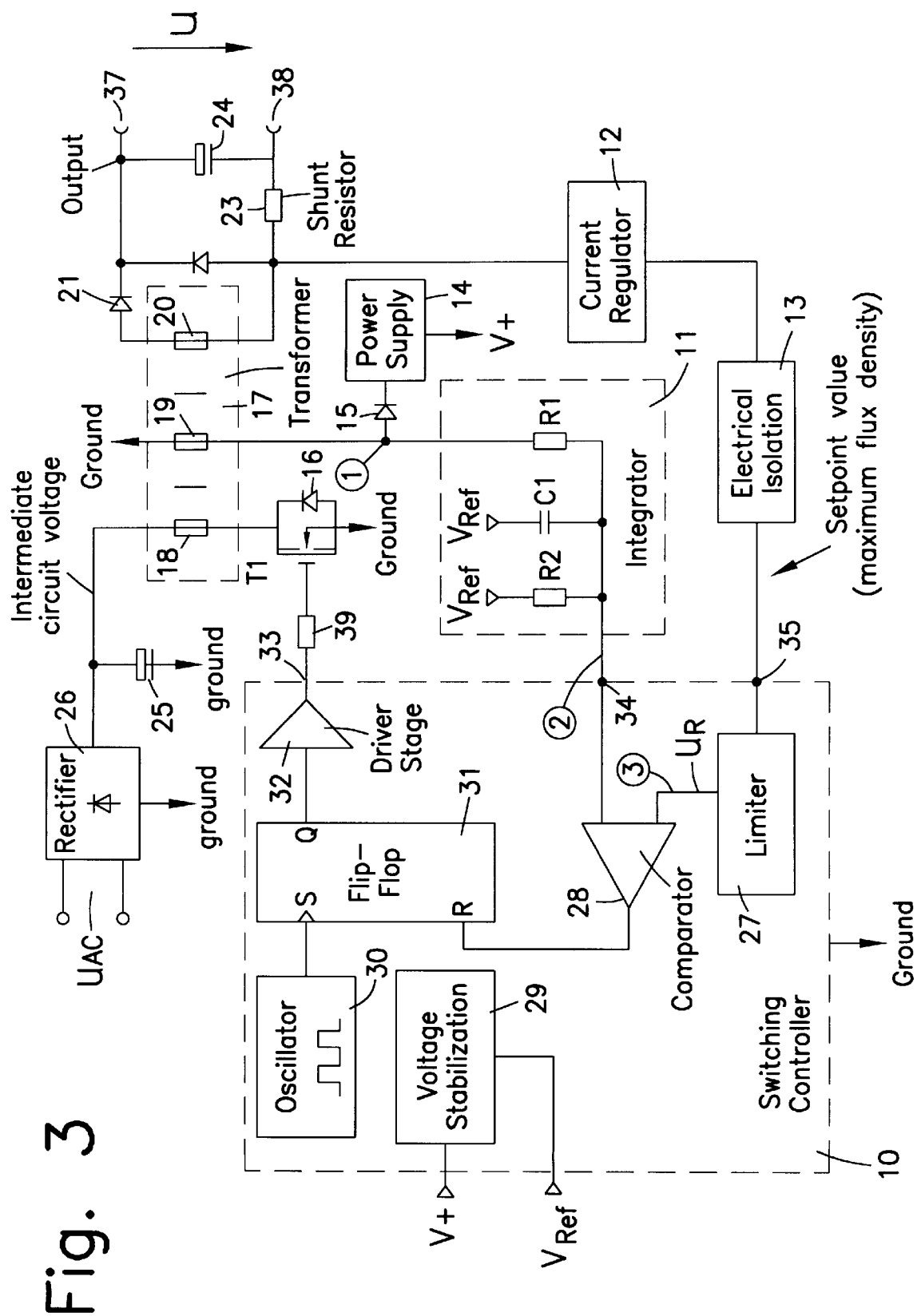
FIG. 3 shows an exemplary embodiment according to the present invention.

FIG. 3 shows a transformer with two magnetically coupled coils 19, 20, which are supplied by another coupled coil 18. Coil 20 is connected in parallel with an output capacitor 24 across a series-connected rectifier 21 and a shunt resistor 23. In parallel with output capacitor 24 there is an output terminal 37, 38 and a position voltage U can be picked up. Coil 19 has one end connected to ground and its second end connected to a power supply 14 across a diode 15. An integrator 11 is connected at node 1 between the second end of coil 19 and diode 15. At the input end, integrator 11 has a resistor R1 and a capacitor C1 whose second end is connected to a reference voltage $V_{ref}$. Reference voltage $V_{ref}$ is connected across another resistor 22 to the second node 2 which is formed by capacitor C1 and resistor R1. In addition, a first input 34 of a switching controller 10 is connected to node 2. Switching controller 10 is preferably provided as a commercial integrated circuit. It has a comparator 28 whose inverting input is connected to the first input 34. The non-inverting input of comparator 28 forms a node 3 at which control voltage $U_R$ is preset. Node 3 is connected to a second input 35 of switching controller 10 across a limiter 27. The output of comparator 28 is connected to one input R of a flip-flop 31. An oscillator 30 is connected to a set input S of flip-flop 31. An output Q of flip-flop 31 is connected to a driver stage 32 whose output is connected to a control input of a transistor T1 across a terminal 33 and an isolating resistor 39. For the sake of thoroughness, it is also pointed out that switching controller 10 has a voltage stabilization 29 which is designed to supply power to the internal components and to form a reference voltage $V_{ref}$.

Transistor T1, e.g., a MOS transistor, has a free-wheeling diode 16 in its load circuit. Transistor T1 is connected to ground and to one end of the other end of coil 18. The other coil 18 is connected to line voltage $U_{AC}$ across a rectifier 26. A filter capacitor 25 is connected to ground in parallel to rectifier 26.

A current regulator 12 is connected at the node between shunt resistor 23 and coil 20, and its second terminal is connected to the second input 35 of switching controller 10 across electrical isolation 13.

Figure 4:
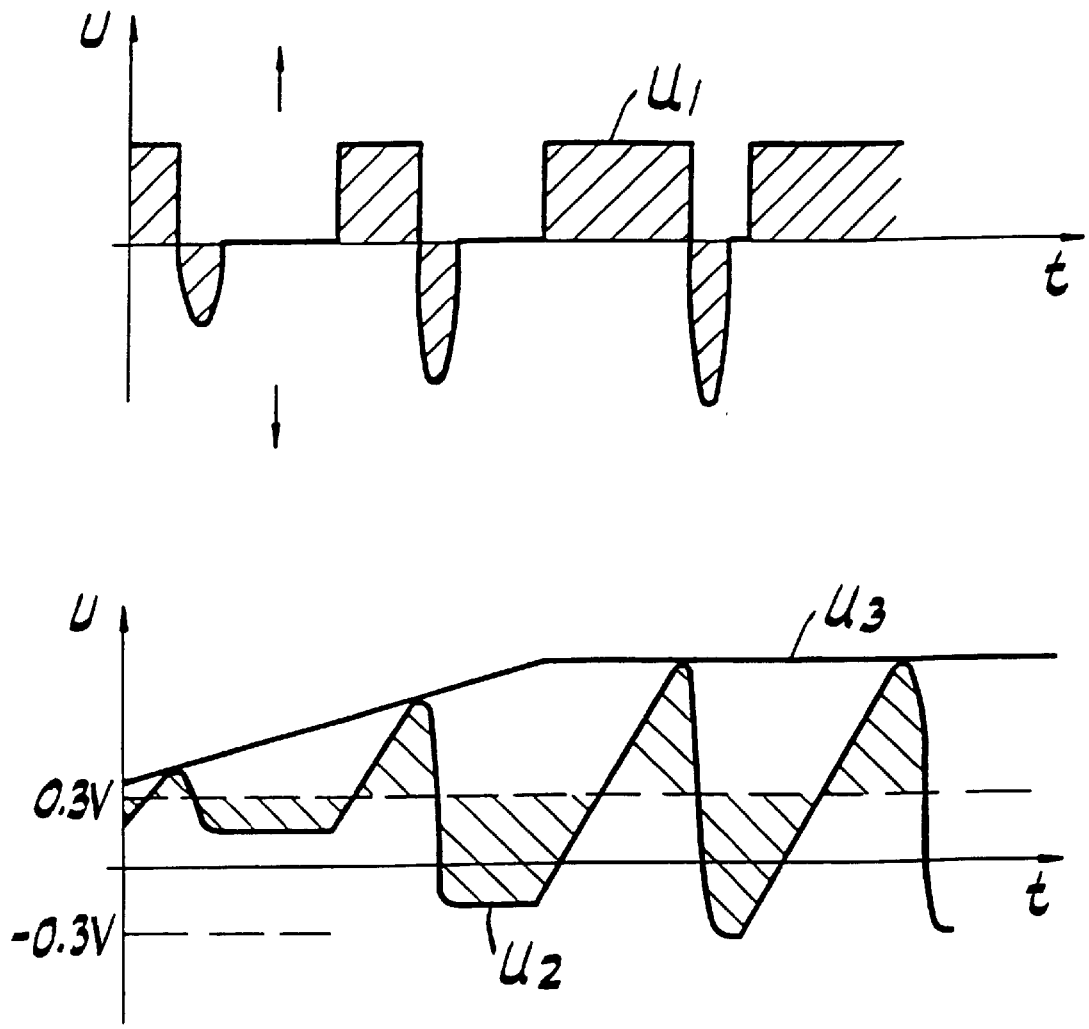
FIG. 4 shows two voltage diagrams for an operation of a switching controller illustrated in FIG. 3.

FIG. 4 shows two diagrams with the charging voltage variation at the three nodes 1 through 3. The top diagram shows the voltage curve $U_1$ at the first node 1, measured on coil 19 (auxiliary winding) of transformer 17. The bottom diagram shows the corresponding voltage curve $U_2$, $U_3$ at nodes 2 and 3 in chronological relation to the top diagram.

The functioning of the embodiment according to FIG. 3 is explained in greater detail below.

The change in flux density in the transformer can be calculated according to the induction equation:

$$\Delta B = \frac{1}{N \cdot A} \cdot \int u \cdot dt$$

All the variables in the switched-mode power supply are known or can be measured easily. $\Delta B$ is the change in flux density which is sought, N is the number of turns in the transformer, based on the voltage u to be integrated, and A is the smallest cross-sectional area of the transformer. Almost all transformers have an auxiliary winding on the primary side to supply the switching controller with a voltage. This can be integrated directly to determine the instantaneous flux density.

A circuit for integration of this voltage is very simple. It consists only of an RC element R1, C1 which can be easily dimensioned.

The present invention consists of not operating the switching controller in the current or voltage mode but instead using as the setpoint a peak flux density at which the switching transistor is switched off.

FIG. 3 shows the block diagram of such a controller, and FIG. 4 shows preferable variations, using the example of a single-ended forward converter with secondary current regulation in the steady state.

To explain: In FIG. 3, oscillator 30 serves to generate the switching frequency. It attempts to switch on transistor T1 at fixed intervals by setting flip-flop 31. However, the latter is set only when the comparator does not request a reset pulse. If it is set, T1 switches on and transformer 17 is magnetized with an intermediate circuit voltage. C1 and R1 form the integrator of the transformer voltage, thus resulting in a voltage that is proportional to the flux density at node 2. If the voltage exceeds the setpoint which is preset at node 3 and can be limited to a fixed voltage, the comparator performs a reset, so T1 is switched off again. Now transformer 17 undergoes reversal of magnetization over the transistor capacitance of T1. This is also recorded at C1 and reproduced correctly. The negative magnetic bias is maintained from the end of the reversal of magnetization until the next time the transistor is switched on.

Due to the fact that C1 is connected not to ground but instead to $V_{ref}$, a smooth start results when starting up the power supply unit. R2 serves only for offset adjustment of the voltage at node 2, so that the input of comparator 28 is not overridden. All the components which are combined in switching controller 10 are integrated into an IC in a low-cost design.

What is claimed is:

1. A switched-mode power supply comprising:

a switched-mode primary side transformer having an output;

a regulator for regulating at least one of an output current and an output voltage at the output of the transformer; and a; switching device for measuring a magnetization voltage corresponding to a magnetic flux density of the transformer, the magnetization voltage being compared with a preset control voltage corresponding to a peak flux density of the transformer, the switching device substantially preventing a saturation of the transformer by interrupting a power supply of the transformer when the magnetization voltage reaches the preset control voltage, wherein the switching device includes an integrator, the integrator including a resistor and a capacitor coupled in series, the capacitor having a first terminal coupled to the resistor and having a second terminal coupled to a reference voltage.

2. The switched-mode power supply according to claim 1, further comprising:

a switching controller regulating the switching device, the switching controller being clocked at a constant frequency.

3. The switched-mode power supply according to claim 1, wherein the switching device controls the magnetic flux density of the transformer to a constant level to substantially prevent the saturation of the transformer.

* * * * *